June 23, 1942.  L. J. SCHNEIDER  2,287,573
INLAYING METHOD
Filed April 23, 1940
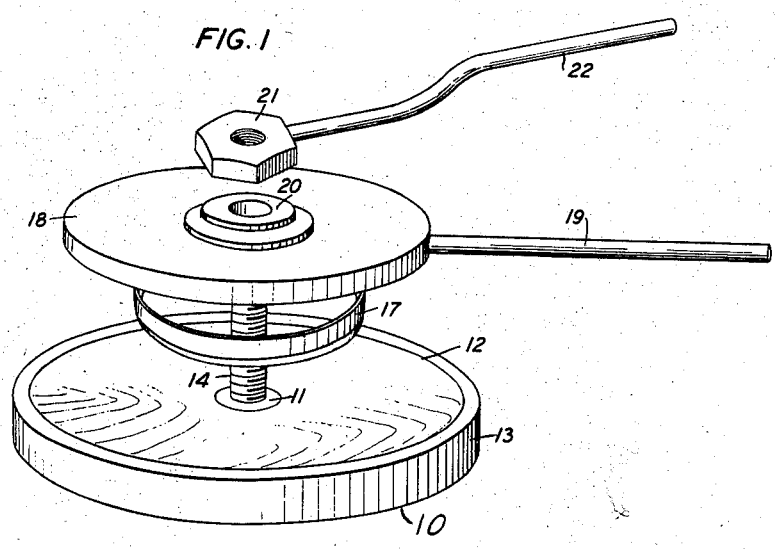
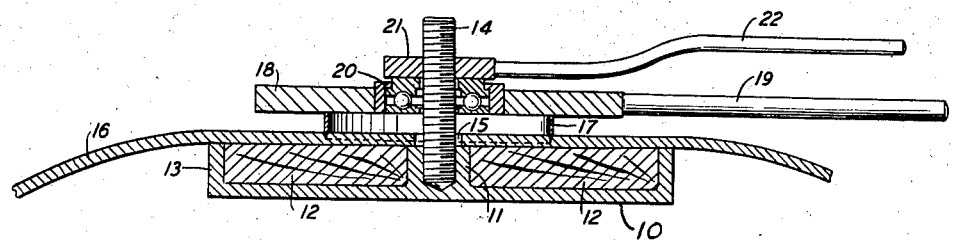
INVENTOR
LOUIS J. SCHNEIDER
BY
John C. Morris
ATTORNEY Patented June 23, 1942

2,287,573

UNITED STATES PATENT OFFICE 2,287,573

INLAYING METHOD

Louis J. Schneider, Rockville Centre, N. Y.

Application April 23, 1940, Serial No. 331,110

5 Claims. (Cl. 154—26)

This invention relates to pattern inlaying of covering materials and more particularly to a method of and means for the inlaying of designs in plastic, fabric and other similar materials, employed for covering floors, walls, decks, counters and the like. Some specific exemplary materials, which may be inlaid in accordance with this invention, are linoleum, rubber tile, carpet and rugs. Much of the following description of an illustrative embodiment of the invention will, for convenience, refer to linoleum, as the material to be inlaid.

It has become the practice, in laying linoleum and like materials, to employ a material having a neutral background and to insert, at the place of laying, inlays of contrasting colors, suitable to the location and the desires of the user. This requires the laying out of the patterns on the material, cutting out the portions where the inlays are to be inserted, cutting suitable inlays and securing them in place in the openings provided. This practice as heretofore employed, produces pleasing and desirable results but increases the cost of linoleums and other covering materials, because of the additional time and skill required for installation.

One known method of inlaying linoleum comprises marking out the pattern on a large, e. g., roomsize, sheet of a neutral background or marbelized type of material. The parts where the inlays are to be inserted are then carefully cut out with a sharp knife. Inlay pieces of suitable color are then cut to fit the various openings and secured in place by cement or like means. In order to prevent spoilage and to insure tight fitting inlays, a high degree of skill is required. Furthermore, even a skillful workman must take considerable time, thereby running up the labor cost.

It has been proposed to employ cutting dies for making the openings and the inlays. However, various difficulties attendant upon the use of dies, have retarded their adoption to a great degree. One particular difficulty has arisen, when it was desired to inlay those parts of a large sheet of material adjacent the center or remote from the edges. In order to drive even a sharp die through material such as well-cured linoleum, a great deal of force must be applied thereto. In working near the edges of a sheet, a device constructed somewhat after the manner of the well-known C-clamp, may be employed for applying the cutting force to the die. However, when cuts are required remote from the edge, a device of this type having sufficient strength to do the job, is too heavy and unwieldly to be of practical use.

Another method, which has been employed to some extent, comprises driving a die with successive blows of a heavy hammer. Due to the extreme difficulty of applying the force of the hammer, always in a direction perpendicular to the surface of the linoleum, there is a tendency for the die to move sidewise. If the sidewise motion is in the same direction for each blow, a cut having an inward bevel on one side and an outward bevel on the other results. If the sidewise motion changes in direction from blow to blow, the edge of the opening is ragged. In either case, a properly fitting inlay is difficult or impossible to achieve by this method. Moreover, the heavy pounding is objectionable, both because of possible damage to the structure in which the work is being done and because of the annoyance due to noise.

It is an object, therefore, of this invention, to inlay covering materials accurately, rapidly and at low cost.

It is a further object of this invention to accurately cut inlay openings in any desired portion of large sheets of covering material without the difficulties heretofore encountered.

One feature of this invention resides in apparatus, which smoothly applies adequate force to cutting dies in a direction perpendicular to the surface to be cut.

In accordance with another feature of this invention, the force-applying apparatus, capable of operating in accordance with the foregoing feature, sufficiently light and small to render it easily portable.

A further feature of this invention lies in the method of operating the apparatus, whereby inlay openings may be cut in any desired portion of large sheets of covering material.

Other and further objects and features of the invention will be understood more fully and clearly from the following detailed description of an illustrative embodiment thereof with reference to the appended drawing in which:

Fig. 1 is a view in perspective of a device illustrative of the invention;

Fig. 2 is a view in perspective of a plurality of cutting dies suitable for use with the device of Fig. 1; and Fig. 3 is a sectional view of the apparatus applied to a sheet of covering material.

Referring to Figs. 1 and 3 of the drawing, 10 comprises a base member or plate, preferably of a metal such as cast iron or the like. The central portion of plate 10 may take the form of an internally threaded boss 11. The upper surface of the base plate is provided with a member 12 of hard wood or other material suitable for a cutting block. In the form illustrated, the member 12 is centrally orificed to receive boss 11 and is fitted within a protecting rim or flange 13. If desired, the base plate 10, having a suitable threaded orifice, may be made somewhat thicker with no central boss or rim and the block 12 laid thereon. Several locating pins or studs may be provided on the top surface of plate 10 to enter mating openings in the block 12, thereby preventing shifting of said block. A screw or threaded rod 14 is secured in the orifice of plate 10. A cutting die 17 surrounds the screw 14 and in use rests on the material 16, as shown in Fig. 3. A presser plate or force transmitting member 18 lies on top of the die 17. The presser plate 18 may be provided with a handle 19. In view of the large force to be transmitted, the member 18 is preferably provided with an anti-friction, thrust bearing 20. A nut or similar threaded element 21 engages the screw 14 above the bearing 20. The nut 21 is preferably provided with a handle 22, although a conventional nut and wrench may be employed.

The device is used as follows: A small hole 15 of sufficient size only to easily receive screw 14, is cut in the material 16, centrally of the area to be cut out. The base plate 10 with block 12 in place, is positioned under the material 16 with its threaded orifice in substantial register with the hole 15. If the opening to be cut is far from the edge of a large sheet of material, this may be accomplished by rolling back a sufficient portion of said material. The screw 14 is then inserted through the hole 15 and secured in the base plate. The die 17 is set in position on the material and presser plate 18 applied thereto. The nut 21 is then screwed down on threaded rod or screw 14 against the thrust bearing 20 of the presser plate. Before pressure is applied to the die 17, any minor inaccuracies of location thereof may be remedied. The nut 21 is then screwed down by means of the handle 22 driving the die 17 cleanly through the material 16 against the block 12. The handle 19 of the presser plate 18 may be held, during cutting, to prevent any rotation thereof and consequent shifting of the die. The anti-friction, thrust bearing 20 permits the force to be applied smoothly without the expenditure of undue effort. The apparatus is then removed and shifted to another portion of the material. The inlays may be inserted after the cutting of each opening or after all are cut depending upon the material being inlaid.

When the material is linoleum or the like, which is usually cemented down, the openings are all cut and then the inlays are secured in place as part of the cementing operation. In the case of rugs, carpets and other fabric materials requiring sewing or similar methods for securing the inlays in place, this is done prior to laying.

The inserts may be cut out in any convenient manner. Preferably, to insure a good fit, each inlay is cut with the same die used for cutting its opening or a suitable duplicate thereof. The accuracy of cutting by the method and with the apparatus of this invention is so high, that inlay pieces of suitable color and configuration, may be precut and taken on the job with the assurance that they will fit properly in the openings provided. A suitable device for cutting out inserts or inlay pieces is one similar to the well-known letterpress.

As illustrated in Fig. 2, dies of various configurations may be employed. Preferably a set of dies comprises a plurality of basic shapes, which may be combined to form a large number of different patterns. The dies may be made relatively shallow as illustrated or deeper and heavier depending upon the material to be cut. In the interest of portability the dies should be as light as possible, consistent with proper strength, wearability, and accuracy. As will be seen from an inspection of the drawing the dies have a sharp knife-edge in order that they may cut a clean-edged, accurate opening or inlay piece.

Although this invention has been disclosed by means of a specific illustrative embodiment thereof, it is to be understood that it is not limited thereby. Other equivalent forms of the apparatus may be substituted and it may be applied to any materials of the class described without departing from the spirit and scope of the invention which is defined by the appended claims only.

What is claimed is:

1. The method of inlaying linoleum and like materials, that comprises making a small orifice through the material within the area to be inlayed, severing the material to be replaced by an inlay by gradually applying forces simultaneously to both sides of the material, said forces cooperating by way of said orifice, removing the severed material, and securing a contrasting inlay in place of the removed material.

2. The method of inlaying linoleum and like materials, that is particularly adapted for operation at the place of use of said material and which comprises, making a small orifice through the material at each zone to be inlayed, each orifice being entirely within the zone with which it is associated, supporting portions of the material from one side thereof, each portion including an inlay zone, severing the material in each of said zones by the gradual application of force applied from the opposite side of the material, the reaction to said force being due to the supporting from said one side and acting through said orifice, removing the severed material, and replacing the removed material in each zone with an inlay adapted to completely fill each zone respectively.

3. The method of inlaying linoleum and like materials, that comprises making an opening through the material within a zone to be inlayed, applying cooperating forces to opposite sides of the material by way of said opening to sever a portion of material of selected configuration, removing the severed material, and inserting a contrasting piece of material of the same configuration in place of the removed material.

4. The method of inlaying linoleum and like materials, that comprises making an opening through the material within a zone to be inlayed, severing the material from said zone by the application of force from the front of said material to both the front and back thereof, the force acting at the back being transmitted through said opening, removing the severed material, and filling said zone with an inlay of contrasting material.

5. The method of inlaying linoleum and like materials, that comprises making a small orifice through the material within a zone to be inlayed, severing the material adjacent said orifice in conformance with a desired pattern by gradually applying coupled forces simultaneously to opposite sides of the material, the coupling being solely by way of said orifice, removing the severed material, and inserting a piece of contrasting material of the desired pattern in place of the material which has been removed.

LOUIS J. SCHNEIDER.